Patented Oct. 23, 1928.

1,688,504

UNITED STATES PATENT OFFICE.

CLAUDE G. MINER, OF BERKELEY, CALIFORNIA.

PROCESS OF PRODUCING ANHYDROUS ALUMINUM HALIDES AND NITROGEN BY-PRODUCTS.

No Drawing.   Application filed June 28, 1926. Serial No. 119,233.

This invention relates to a method for the commercial production of anhydrous aluminum halides and nitrogen by-products, and is more particularly directed to a process for the commercial production of anhydrous aluminum chloride and certain nitrogen by-products.

The catalytic properties of aluminum chloride for cracking oil are generally known. The use of this catalytic agent, however, has been very limited, due to the difficulty of the present processes in producing the anhydrous aluminum chloride at a price where it can compete in cracking processes with other known petroleum oil cracking methods, such as by the use of pressure. According to this invention, anhydrous aluminum chloride can be produced in a very inexpensive manner and at a figure whereby it can be used in cracking processes in competition with other known and used cracking processes or methods. The ability to produce anhydrous aluminum chloride in accordance with this invention at such a figure that the same can be used commercially in cracking processes is due to the fact that there are produced in this process certain nitrogen by-products which will partially or wholly pay the cost of operation and production of the anhydrous aluminum chloride.

It is therefore the principal object of this invention to produce a commercially practical method by which anhydrous aluminum halides and certain nitrogen by-products may be produced.

Another object of this invention is to provide a comercially practical method by which anhydrous aluminum chloride and certain nitrogen by-products may be produced from aluminum nitride.

It is known that dry hydrochloric acid gas decomposes aluminum nitride at about 1000 degrees centigrade according to the following equation:

(1). $Al_2N_2 + 8HCl = 2(AlCl_3.NH_4Cl)$ 

This reaction, however, produces a double chloride of aluminum and ammonium which is extremely stable and from which it is difficult to obtain aluminum chloride. This double chloride is not useful as a catalytic agent in oil cracking processes.

I have discovered that if aluminum chloride and ammonium chloride are mixed in different ratios and tested for cracking oils, that in each case one gram molecular weight of ammonium chloride will remove one gram molecular weight of aluminum chloride from catalytic activity, and that it is therefore essential that aluminum chloride be employed in as pure a state as possible in such cracking processes as about 53 parts by-weight of ammonium chloride will remove about 133 parts by-weight of aluminum chloride from catalytic activity in such oil cracking processes.

I have discovered that high grade aluminum chloride in a high state of purity can be. produced by treating aluminum nitride with hydrochloric acid gas in the presence of carbonaceous material at an elevated temperature.

I have also discovered that the best and most efficient results are obtained by carrying out this process at about 1300° C. and that an effective range of temperature for the carrying out of this process lies between 900° C. and 1500° C. although the process may be carried out at a temperature without this range.

I have also discovered that by combining aluminum nitride with hydrochloric acid in the presence of carbonaceous materials that there is produced certain nitrogen compounds in which the nitrogen is fixed so as to be available for the production of both amines and cyanogen compounds and other valuable fixed nitrogen compounds.

The exact nature of the fixed nitrogen products produced is difficult to ascertain and from a series of tests which have been conducted, it is believed that the following reaction takes place:

(2). $Al_2N_2 + 7HCl + 2C =$ 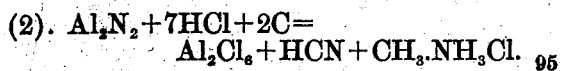
$Al_2Cl_6 + HCN + CH_3.NH_3Cl.$

The reaction between aluminum nitride and hydrochloric acid gas takes place at a red to white heat in the presence of carbonaceous material and gives aluminum chloride, cyanogen compounds, and amines such as methylamine hydrochloride. The poisonous cyanogen products may be eliminated, if hydrogen or a hydrogen bearing gas such as water gas is introduced with the hydrochloric acid, all of the nitrogen being combined to form methylamine. An excess of hydrochloric acid gives methylamine hydrochloride. The following reaction is representative when there is not an excess of hydrochloric acid:

(3). 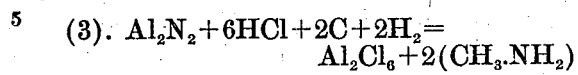

With an excess of hydrochloric acid the reaction may be expressed as:

(4). 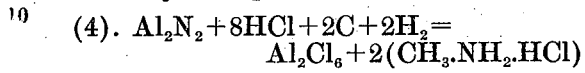

In carrying out this process on a laboratory scale, hydrochloric acid gas was first generated from sodium chloride and concentrated sulfuric acid. The resultant hydrochloric acid gas was passed over a mixture of aluminum nitride and lampblack for two and one-half hours at 900° C. .173 grams of aluminum nitride were employed and .131 grams of lampblack were employed and after the treatment with the hydrochloric acid gas as generated approximately .051 grams of residue remained, showing that the decomposition of the aluminum nitride was practically complete.

As a further check, the residue was ignited to remove the carbonaceous material or lampblack and there was found to remain after this ignition .006 grams of non-combustible residue, showing that there was a minimum decomposition of aluminum nitride of approximately 97%.

In another laboratory experiment carried on in the same manner, aluminum nitride and carbon were mixed in large quantities in order to collect the sublimates and analyze the same. In this experiment, 10.19 grams of nitride and 6.25 grams of carbon were used. Hydrochloric acid gas was passed over the mixture at about 1000° C. and the sublimate condensed in a cold portion of the tube. The sublimate analyzed 2.6% ammonium chloride and 97.4% aluminum chloride. On analysis of the products, it has been found that there was produced in this process no free hydrogen and no free nitrogen so that it has been shown that this reaction takes place substantially in accordance with reaction No. 2, or a reaction similar thereto to produce not only anhydrous aluminum chloride but fixed nitrogen compounds and that there is produced in accordance with this reaction no free nitrogen or free hydrogen.

In accordance with this invention, there has been produced aluminum chloride of a high grade of purity which is extremely well adapted for use as a catalytic agent in oil cracking processes and there are produced fixed nitrogen compounds which, as in the case of hydrocyanic acid, may be passed over heated brick work at about 160° C. with steam to produce ammonia and carbon monoxide or the cyanogen, amines and nitrogen compounds may be recovered as produced or converted into any other compounds by well known methods as desired and as the market requires.

It will therefore be obvious that this invention resides in the treatment of aluminum nitride with hydrochloric acid gas at a red to white heat in the presence of carbonaceous materials and that there is produced anhydrous aluminum chloride of a high degree of purity which may be vaporized and condensed from the residual compounds as required or desired, or which may be prepared in any other desired manner, or which may be condensed on formation in any desired manner to produce substantially pure aluminum chloride and that the process produces fixed nitrogen compounds in which the nitrogen is in a highly available state and may be recovered and used as desired. It will be evident that chlorine and hydrogen, or a gas containing hydrogen, such as water gas, may be used instead of the hydrochloric acid for decomposition of the nitride as the chlorine and hydrogen will form hydrochloric acid at the temperatures employed.

Although I have herein set forth as an illustrative example only one method of producing anhydrous aluminum chloride from aluminum nitride and hydrochloric acid in the presence of carbon, it is to be understood that this invention is addressed to the production of aluminum halides generally from aluminum nitride, employing an acid gas of the halogen series in the presence of carbon and at an elevated temperature.

Having fully described my invention, it is to be understood that I do not wish to be limited to the exact details herein set forth which may obviously be varied without departing from the spirit of my invention as set forth in the appended claims.

I claim:

1. A process of manufacturing anhydrous aluminum halides which consists in passing an acid halide gas over aluminum nitride and a carbonaceous material at an elevated temperature.

2. A process of manufacturing aluminum halides which consists in passing an acid halide gas over aluminum nitride and a carbonaceous material at a temperature between 900° C. and 1500° C.

3. A process of manufacturing anhydrous aluminum chloride which comprises passing hydrochloric acid gas over aluminum nitride mixed with a carbonaceous material at an elevated temperature.

4. A process of manufacturing anhydrous aluminum chloride which comprises passing hydrochloric acid gas at a red to white heat over a mixture of aluminum nitride and a carbonaceous material.

5. A process of manufacturing anhydrous aluminum chloride which comprises passing hydrochloric acid gas at approximately 1300° C. over a mixture of aluminum nitride and carbonaceous material.

6. A process of manufacturing anhydrous aluminum chloride from hydrochloric acid gas, aluminum nitride and carbonaceous material in accordance with the following reaction:

$$Al_2N_2 + 7HCl + 2C = Al_2Cl_6 + HCN + CH_3.NH_2Cl$$

7. A process of manufacturing anhydrous aluminum chloride which consists in passing hydrochloric acid gas at a red to white heat over a mixture of aluminum nitride and carbon in the approximate ratio of 3 parts of nitride to 1 part of carbon.

8. A process of manufacturing anhydrous aluminum chloride and nitrogen by-products which comprises passing hydrochloric acid gas at a red to white heat over a mixture of aluminum nitride and carbonaceous material at an elevated temperature.

9. A process of manufacturing an aluminum halogen salt which comprises passing an acid of the halogen series over aluminum nitride and carbonaceous material at a red to white heat.

10. A process of manufacturing an aluminum halogen salt which consists in passing an acid gas of the halogen series over aluminum nitride and a carbonaceous material at approximately 1300° C.

11. A process of manufacturing aluminum chloride which comprises passing hydrochloric acid gas over aluminum nitride at a red to white heat in the presence of carbonaceous material, condensing the aluminum chloride and collecting the resultant aluminum chloride separate from the nitrogen compound produced.

12. A process of manufacturing aluminum chloride and certain nitrogen by-products which consists in passing hydrochloric acid gas over a mixture of aluminum nitride and carbonaceous material in proper proportions at a red to white heat, condensing the aluminum chloride and bringing the resultant fixed nitrogen compounds into contact with steam at an elevated temperature to obtain ammonia.

13. A process of manufacturing aluminum chloride and nitrogen products which consists in passing hydrochloric acid gas over a mixture of aluminum nitrogen and carbonaceous material in proper proportions at a red to white heat, condensing the aluminum chloride and bringing the resultant nitrogen compounds into contact with steam over heated brick work to produce ammonia.

14. A process of manufacturing aluminum halogen salts which consists in passing an acid halogen gas over aluminum nitride and a carbonaceous material at an elevated temperature, condensing the aluminum halogen salt and collecting the resultant fixed nitrogen compound separate from the aluminum halogen salt.

Signed at San Francisco this 16 day of June, 1926.

CLAUDE G. MINER.